(12) United States Patent
Seidberg

(10) Patent No.: US 12,370,947 B1
(45) Date of Patent: Jul. 29, 2025

(54) TRAIN CROSSING WARNING SYSTEM, APPARATUSES AND METHODS THEREFOR

(71) Applicant: RAPIDSOS, INC., New York, NY (US)

(72) Inventor: Daniel Richard Seidberg, Manlius, NY (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 19/004,814

(22) Filed: Dec. 30, 2024

(51) Int. Cl.
| | |
|---|---|
| B60Q 9/00 | (2006.01) |
| B61L 25/02 | (2006.01) |
| H04W 4/021 | (2018.01) |
| H04W 4/40 | (2018.01) |

(52) U.S. Cl.
CPC ............ B60Q 9/008 (2013.01); B61L 25/025 (2013.01); *H04W 4/021* (2013.01); *H04W 4/40* (2018.02)

(58) Field of Classification Search
CPC ........ B60Q 9/008; B61L 25/025; H04W 4/40; H04W 4/021
USPC ...................................................... 340/425.5
See application file for complete search history.

(56) References Cited

U.S. PATENT DOCUMENTS

| | | | | |
|---|---|---|---|---|
| 5,515,026 A * | 5/1996 | Ewert | ................... | B60Q 1/525 340/384.1 |
| 5,554,982 A * | 9/1996 | Shirkey | ............... | B61L 15/0092 340/901 |
| 5,825,412 A * | 10/1998 | Hobson | .................... | H04N 7/18 348/148 |
| 6,553,308 B1 * | 4/2003 | Uhlmann | ......... | G08G 1/096811 340/988 |
| 6,619,593 B1 * | 9/2003 | Callahan | ............... | B61L 29/246 246/115 |
| 6,641,091 B1 * | 11/2003 | Hilleary | .................. | B61L 29/08 246/111 |
| 8,054,197 B1 * | 11/2011 | Martin | .................... | B61L 29/24 340/936 |
| 9,841,287 B1 * | 12/2017 | Hayward | ............. | G01C 21/005 |
| 11,414,111 B1 * | 8/2022 | Olsen | .................. | B61L 15/0072 |
| 11,748,664 B1 * | 9/2023 | Mazumder | ............ | G06V 20/58 382/104 |
| 2008/0291052 A1 * | 11/2008 | Burns | .................... | G08G 1/164 340/988 |
| 2012/0001767 A1 * | 1/2012 | Ballinger | ................ | B61L 29/24 340/692 |
| 2014/0339374 A1 * | 11/2014 | Mian | ....................... | B61L 29/30 246/473.1 |
| 2016/0200330 A1 * | 7/2016 | Palmer | .................... | B61L 27/57 701/29.1 |
| 2016/0307294 A1 * | 10/2016 | McPhail | ................. | G06T 17/05 |

(Continued)

Primary Examiner — Brian A Zimmerman
Assistant Examiner — Thang D Tran
(74) Attorney, Agent, or Firm — Cygan Law Offices PC; Joseph T. Cygan

(57) ABSTRACT

A disclosed method implements: determining, by a cloud server, a geofence surrounding a section of a roadway at a crossing of train tracks, the geofence comprising geofence coordinates; monitoring, by the cloud server, railway sensor and telematics data related to trains running on the train tracks at the crossing; predicting that a train will approach the crossing at a predicted time; generating a warning message in response to predicting that a train will approach the crossing at a predicted time; and sending the warning message to a vehicle located within the geofence.

13 Claims, 8 Drawing Sheets

(56) References Cited

U.S. PATENT DOCUMENTS

| | | | | |
|---|---|---|---|---|
| 2017/0113707 A1* | 4/2017 | Ghaly | ............... | B61L 27/20 |
| 2019/0147264 A1* | 5/2019 | Aoi | ............... | G06V 20/56 |
| | | | | 382/103 |
| 2019/0272746 A1* | 9/2019 | Aguiar | ............... | G08G 1/065 |
| 2020/0410237 A1* | 12/2020 | Soryal | ............... | G03H 1/0005 |
| 2021/0323407 A1* | 10/2021 | Thompson | ............... | B60K 35/22 |
| 2022/0041194 A1* | 2/2022 | Lidgett | ............... | B61L 27/57 |
| 2022/0295025 A1* | 9/2022 | Seidel | ............... | H04R 1/32 |
| 2022/0324496 A1* | 10/2022 | Lin | ............... | B61L 29/00 |
| 2023/0053030 A1* | 2/2023 | Olsen | ............... | B61L 23/34 |
| 2023/0100640 A1* | 3/2023 | Woycik | ............... | B61L 29/246 |
| | | | | 701/117 |
| 2023/0138981 A1* | 5/2023 | Willoughby | ............... | B60W 10/20 |
| | | | | 701/26 |
| 2023/0202533 A1* | 6/2023 | Nativ | ............... | E01C 15/00 |
| | | | | 104/28 |
| 2024/0262315 A1* | 8/2024 | Salter | ............... | B60R 25/32 |

\* cited by examiner

TRAIN CROSSING WARNING SYSTEM, APPARATUSES AND METHODS THEREFOR

CROSS-REFERENCE TO RELATED APPLICATIONS

None.

FIELD OF THE DISCLOSURE

The present disclosure relates generally to railway systems and more particularly to warning systems using telematics data and methods and apparatuses for using telematics to provide warning indications.

BACKGROUND

Motor vehicle collisions with railway systems are a significant safety concern, particularly at railroad crossings. Unfortunately, many incidents occur in which vehicles proceeding across train tracks strike a train while the train is crossing the tracks, or is struck by the train as it is crossing. In the U.S., for instance, the Federal Railroad Administration (FRA) reports that around 2,000 incidents occur annually between vehicles and trains. These collisions typically involve vehicles attempting to cross tracks improperly or failing to stop at warning signals.

One common type of incident is when cars strike the side of trains, often due to drivers bypassing crossing gates or ignoring signals. According to FRA data, roughly 40% of all vehicle-train collisions involve this scenario. On the other hand, vehicles improperly stopped on tracks or unable to clear the crossing in time are also common causes of accidents, especially in congested or poorly designed crossings.

In total, train-vehicle collisions result in dozens of fatalities and hundreds of injuries each year. While the number of such incidents has decreased over the past decades due to improved safety measures, such as the installation of gates and advanced warning systems, the risk remains elevated at locations with less infrastructure or awareness.

Ongoing efforts to improve rail crossing safety, driver education, and infrastructure updates are essential to reducing these types of incidents.

DETAILED DESCRIPTION

Figure 1:
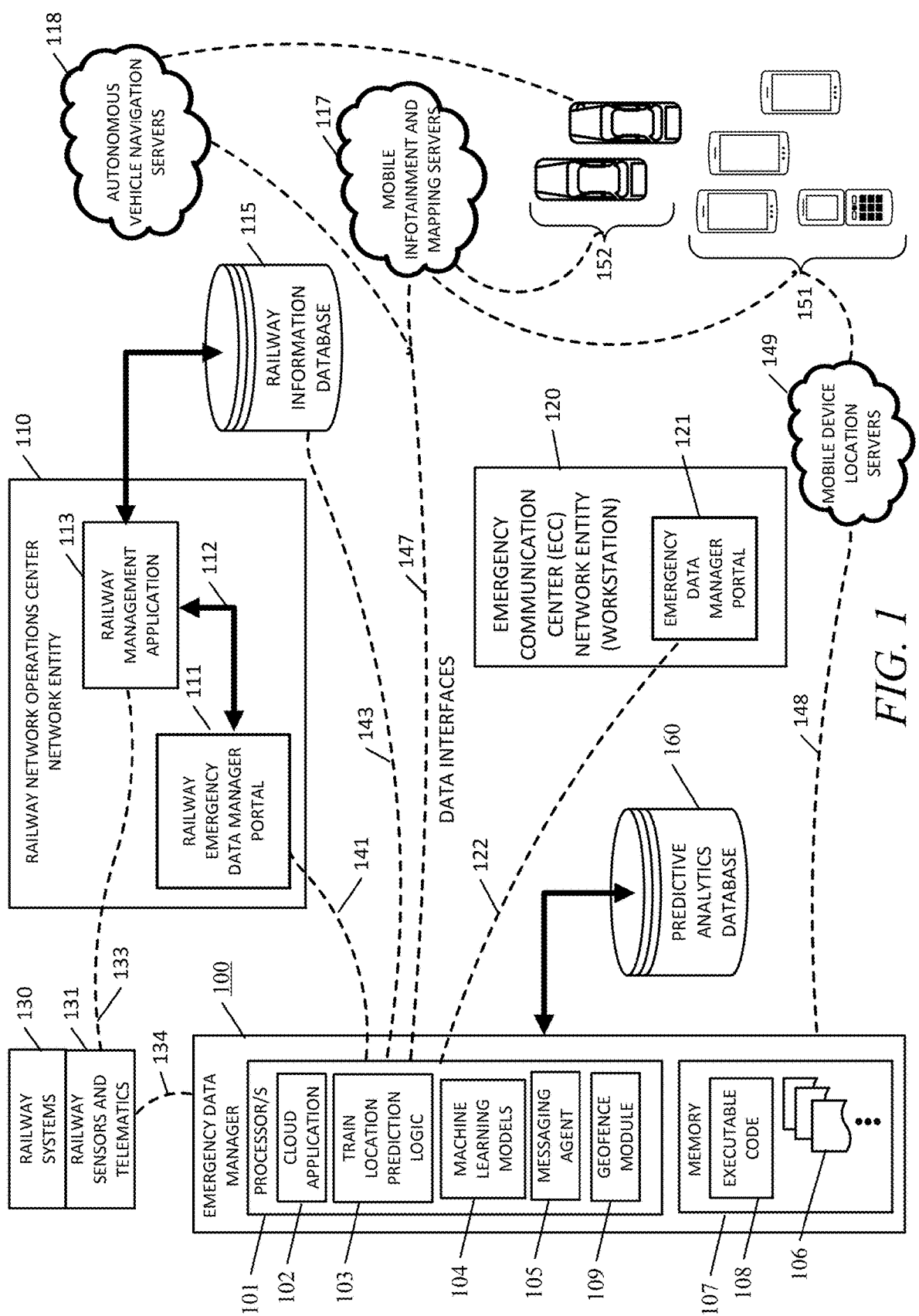
FIG. 1 is a diagram illustrating an emergency data manager in communication with various railway systems and sensors, mobile infotainment and mapping servers, autonomous vehicle navigation servers, mobile device location servers, and various emergency networks, in accordance with various embodiments.

Briefly, the disclosed systems, apparatuses, and methods provide train crossing warning messages to vehicles and mobile devices located within a geofence surrounding a train crossing of a roadway or pedestrian walkway or both.

One disclosed method implements: determining, by a cloud server, a geofence surrounding a section of a roadway at a crossing of train tracks, the geofence comprising geofence coordinates; monitoring, by the cloud server, railway sensor and telematics data related to trains running on the train tracks at the crossing; predicting that a train will approach the crossing at a predicted time; generating a warning message in response to predicting that a train will approach the crossing at a predicted time; and sending the warning message to a vehicle located within the geofence.

The method may further implement: sending the warning message to a mobile device located within the geofence. The method may further implement: sending the warning message to at least one remote server, along with the coordinates for the geofence. The method may further implement: determining, by at least one remote server, that the vehicle is located within the geofence; and sending the warning message to the vehicle infotainment system in response to determining that the vehicle is located within the geofence. The method may send the warning message to at least one remote server, along with the coordinates for the geofence, by sending the warning message to a navigation and mapping server. The method may send the warning message to at least one remote server, along with the coordinates for the geofence, by sending the warning message to a vehicle infotainment server. The method may send the warning message to a vehicle located within the geofence, by sending the warning message to a vehicle infotainment system of the vehicle located within the geofence. The method may send the warning message to a vehicle located within the geofence, by sending the warning message to a mobile device, operatively coupled to a vehicle infotainment system of the vehicle located within the geofence. The method may further implement: providing the geofence coordinates to at least one remote server. The method may further implement: receiving at least one device identifier for a device located with the geofence, in response to providing the geofence coordinates to the at least one remote server.

A disclosed cloud-based railway crossing warning system has at least one cloud server, that provides a cloud application, where the cloud server is operatively coupled to railway sensors and telematics data, and has operatively coupled non-volatile, non-transitory memory. The at least one cloud server is operative to: determine a geofence surrounding a section of a roadway at a crossing of train tracks, where the geofence is defined by geofence coordinates; monitor the railway sensor and telematics data related to trains running on the train tracks at the crossing; predict that a train will approach the crossing at a predicted time; generate a warning message in response to predicting that a train will approach the crossing at a predicted time; and send the warning message to a vehicle located within the geofence.

The at least one cloud server may be further operative to: send the warning message to a mobile device located within the geofence. The least one cloud server may be further operative to: send the warning message to at least one remote server, along with the coordinates for the geofence. The at least one cloud server may be further operative to: send the warning message to the vehicle infotainment system in response to a remote server determination that the vehicle is located within the geofence. The at least one cloud server may be further operative to: send the warning message to a navigation and mapping server where the navigation and mapping server is the at least one remote server. The at least one cloud server may be further operative to send the warning message to at least one remote server, along with the coordinates for the geofence, by sending the warning message to a vehicle infotainment server. The at least one cloud server may be further operative to send the warning message to a vehicle located within the geofence, by sending the warning message to a vehicle infotainment system of the vehicle located within the geofence. The at least one cloud server may be further operative to send the warning message to a vehicle located within the geofence, by sending the warning message to a mobile device, operatively coupled to a vehicle infotainment system of the vehicle located within the geofence. The at least one cloud server may be further operative to: provide the geofence coordinates to at least one remote server. The at least one cloud server may be is further operative to: receive at least one device identifier for a device located with the geofence, in response to providing the geofence coordinates to the at least one remote server.

Another disclosed method implements: monitoring, by an artificial intelligence module that is operatively coupled to a railway system to receive railway sensor and telematics data related to trains running on train tracks at the crossing; predicting, by the artificial intelligence module that a train will approach the crossing at a predicted time, using the railway sensor and telematics data; generating a warning message corresponding to the crossing and based on a geofence surrounding the crossing, the geofence determined by the artificial intelligence module; and sending the warning message to a vehicle located within the geofence.

Turning now to the drawings wherein like numerals represent like components, FIG. 1 is a diagram illustrating a railway crossing notification system that includes an emergency data manager 100 in communication with various railway systems 130 including railway sensors and telematics 131, various emergency communication centers (ECCs) 120, mobile devices 151, and vehicle infotainment systems 152. The term "ECC" includes Public Safety Answering Points (PSAPs) that handle police, fire, and medical emergencies.

The emergency data manager 100 includes at least one processor 101 and non-transitory, non-volatile memory 107 that stores executable code 108. The executable code 108 (also referred to as "executable instructions," "code," "software code," etc.) when executed by the processor 101 provides a cloud application 102, train location prediction logic 103 and machine learning models 104. The processor 101 may be a distributed processor. The train location prediction logic 103 is an AI (artificial intelligence) module. A messaging agent 105 may also be present and may be implemented as hardware, software or a combination thereof. The messaging agent 105 may be a short-message-service (SMS) multimedia message service (MMS) agent. The messaging agent 105 may also be implemented as an AI module. In some embodiments, the messaging agent 105 may be a Google Rich Business Messaging (RBM) agent, Apple Business Chat agent, (i.e. chat agents), or an equivalent, etc., that provides "real time message sessions" such as instant messaging (IM) and chat. The messaging agent 105 is operative to generate messages based on determinations or predictions made by the train location prediction logic 103 and to push the generated messages to the mobile infotainment and mapping servers 117 and autonomous vehicle navigation servers 118, along with geofence information.

In some embodiments, the mobile infotainment and mapping servers 117 in turn provide train crossing notifications to the mobile devices 151 and to the vehicle infotainment systems 152 when the corresponding mobile devices or vehicles are located within a geofence about a given train crossing, and when a train is approaching the train crossing.

The railway sensors and telematics 131 provide real-time data to the emergency data manager 100 to track train locations and monitor their movement across rail networks. The railway sensors and telematics 131 includes GPS (Global Positioning System) data: Telematics data may include sensor data. However, telematics data may include some analysis of data from multiple sensors and sources. Therefore, telematics may include location, speed, direction, time-of-arrival, or the like, etc. In one example implementation, the emergency data manager 100 may receive telematics data from the railway network operations center network entity 110. Most modern trains are equipped with GPS devices that transmit location data, which enable operators and rail control centers to monitor train positions with high accuracy, enabling real-time tracking and predictive arrival times. Onboard sensors and data logging is also provided to the emergency data manager 100. Trains often have onboard systems that monitor speed, direction, and track conditions. These systems can relay information about train position, as well as detect anomalies like signaling issues or track obstructions, further enhancing location accuracy. The emergency data manager 100 may also obtain telematics data including trackside Signals and RFID (Radio Frequency Identification). RFID tags and other trackside sensors are placed along the railway tracks. When a train passes these markers, the system logs the train's position and time, helping to track its movement. This data is particularly useful in areas without continuous GPS coverage, such as tunnels or remote regions. The emergency data manager 100 may also receive telematics data including signal and communication-based train control systems data. Advanced train control systems, such as Positive Train Control (PTC) in the U.S., use a combination of GPS, trackside signals, and communication networks to continually update and monitor train positions in real-time. The emergency data manager 100 uses these telematics systems and data to predict train crossings using train location prediction logic 103. The telematics data is fed into one or more of the machine learning models 104 that have been trained using previously obtained telematics data sets.

The various machine learning models may be stored in memory 107 as machine learning model executable code 106 that when executed by the processor/s 101 implement that machine learning models 104. Each railway system serviced by the emergency data manager 100 may have one or more machine learning models that is uniquely trained for specific railway systems, or for specific railway system telematics data. For example, one or more machine learning models may be trained for trackside signals and RFID, while one or more machine learning models may be trained for GPS data, or for a combination of GPS data with trackside signals and RFID data, and the like, etc.

The processor/s 101 may be implemented as one or more microprocessors, such as a system on a chip (SoC), or using one or more, or combinations of, graphics processing units (GPUs), ASICs such as tensor processing units (TPUs), FPGAs, microcomputers, microcontrollers, digital signal processors, central processing units, state machines, logic circuitries, and/or devices that manipulate signals based on operational instructions. Among other capabilities, the processor 101 is configured and operative to fetch and execute the computer-readable instructions (i.e. executable code 108) stored in the memory 107. For example, the executable code 108, when executed by the processor 101 renders the processor operative to provide a kernel, libraries (i.e. application programming interfaces or "APIs"), an application layer or "user space" within which the various applications are executed, and an IP protocol stack. The applications executable code 108, when executed by the at least one processor 101, may also provide the train location prediction logic 103, machine learning models 104 and messaging agent 105. The processor 101 is operative to perform the various methods of operation of an emergency data manager 100 as described herein including, but not limited to, the methods of operation disclosed herein and described with respect to various flowcharts provided in the drawings. In some embodiments, the emergency data manager 100 may be implemented using one or more cloud servers that provide the cloud application 102 to various ECCs such that there is redundancy and system reliability in the event of failure of any one cloud server.

The railway systems 130 may be any railway systems such as commuter railway systems, freight railway systems, etc. The railway systems 130 includes various railway sensors 131 that provide data including telematics data related to the railway system 130 to a point of control, such as an railway network operations center (NOC) which includes one or more network entities such as railway network operations center network entity 110 (NOC network entity 110). The NOC network entity 110 includes a railway management application 113 that is operation to communicate with the railway system 130 and to receive data from the railway sensors 131.

In some embodiments, the emergency data manager 100 is operative to interface with the NOC network entity 110 to receive the railway sensors and telematics data via an interface 141 and one or more APIs. The cloud application 102 is operative to provide single tenant, or multi-tenant cloud applications for emergency management to multiple NOC network entities and for a variety of different railway systems. The cloud application 102 provides each cloud application instance via a railway emergency data manager portal 111 (REDM portal 111) which provides a graphical user interface GUI to the operator of the NOC network entity 110. The NOC network entity 110 may be, for example, a workstation, laptop computer, etc. Each railway system 130 may have multiple NOC network entities 110 operated by different operators and each operator may execute an instance of the cloud application 102 via the REDM portal 111 and GUI.

In some embodiments, the REDM portal 111 may be operatively coupled to the railway management application 113 (RMA 113) via an application programming interface 112 (API 112) to receive data from the railway sensors 131, or to receive other information and data from the RMA 113. The RMA 113 may also be operatively coupled to a railway information database 115 that contains information related to the railway. The railway information database 115 may contain information such as, but not limited to, railway car consist data, scheduling information, etc. The railway information database may be accessed via an interface 143 which may be an API, a SQL interface, or the like, etc. The REDM portal 111 may also operate via a data interface 141 to the cloud application 102, which may be a web socket connection over a TCP/IP connection, or may be an API data interface in some embodiments.

The cloud application 102, in some embodiments, may also be operative to receive data from the railway sensors 131. The cloud application 102 may receive the sensor data 133 directly via data interfaces 134 in some implementations, or may receive data from via the REDM portal 111 via API 112 as mentioned above. The machine learning models 104 use the railway sensors and telematics data 131 and correlates the data as necessary to predict train roadway crossing at various intersections for a given geographic region. The predictions and analysis may be stored in the predictive analytics database 160 as reports and other information.

As used herein, components may be "operatively coupled" when information can be sent between such two components, even though there may be one or more intermediate or intervening components between, or along the connection path. Operative coupling may exist between engines, system interfaces or components implemented as software or firmware executing on a processor and such "software coupling" may be implemented using libraries (i.e. application programming interfaces (APIs)) or other software interfacing techniques as appropriate. Such libraries or APIs provide operative coupling between various software implemented components in FIG. 1.

The emergency data manager 100 also include a geofence module 109. The geofence module 109 includes a database of train crossings at roadway intersections including the speed limits on the roadways that cross the train tracks. The geofence module 109 forms "geofences" around the intersection several feet or meters from the tracks such that warnings can be provided to vehicles and pedestrians as they move into the geofence.

The term "geofence" as used herein refers to a virtual boundary or a defined geographical area around a specific location, typically defined by latitude and longitude coordinates, which triggers an event or action when an electronic device enters, exits, or remains within that area. Put another way, a geofence is a software-defined perimeter that can be applied to mobile devices, vehicles, or other geospatial systems to monitor and react to location-based events in real-time. In the embodiments herein disclosed, a geofence is determined near and about an intersection at which a roadway, pedestrian walkway, or both, intersect and cross a train track.

More particularly, in technical terms, a geofence, as used herein, is defined by the following parameters: 1. geospatial coordinates (latitude and longitude) that define a geographic center point of the geofence, relative to the geofence geometry; 2. radius or shape, i.e. the physical size of the geofence, often specified as a radius around a center point (e.g., a 500-meter radius), but it can also take other shapes such as polygons with multiple points or even irregular boundaries; 3. event triggers, which include entry (when the device crosses into the defined geofence area), exit (when the device leaves the defined geofence area, and dwell (when the device stays within the geofence for a specified period of time; 4. action or notification (i.e. the event that is triggered when a device enters, exits, or dwells within the geofence, such as sending an alert, starting an action, or logging the event for future use (e.g., sending a push notification, triggering a device action, or recording location data).

Therefore, a geofence as defined herein is differentiated from knowing a device's location. Although both geofencing and knowing the location of a device involve tracking its geographical position, they are distinct in terms of purpose, functionality, and the level of interaction with the location data.

Figure 2:
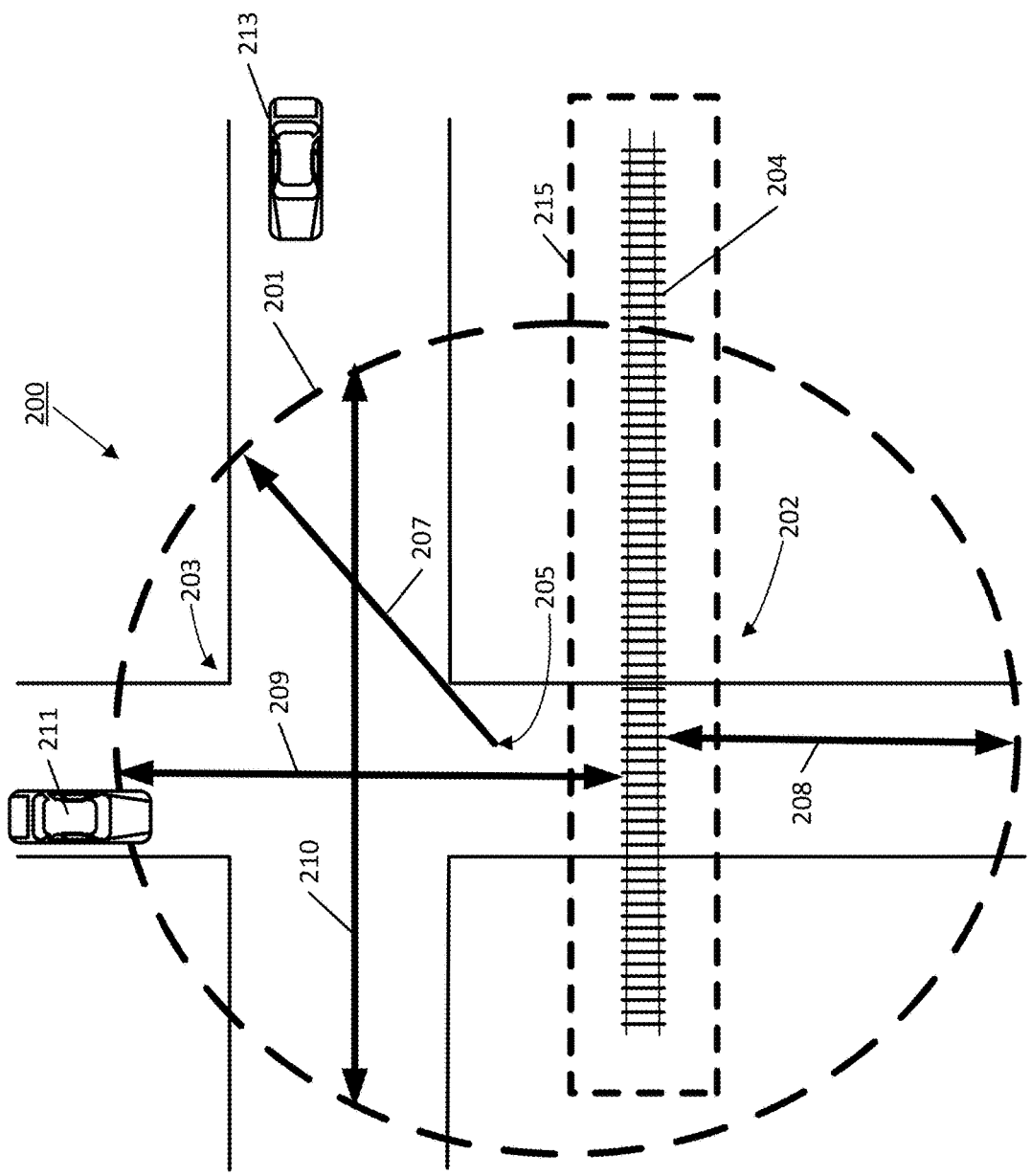
FIG. 2 is a diagram showing a geofence about a train railway crossing, in accordance with various embodiments.

FIG. 2 illustrates a railroad crossing location 200 near a roadway intersection 203 which are near train tracks 204, and a corresponding geofence 201 in accordance with one example embodiment. In some implementations, more than one geofence may be employed at a railroad crossing location 200. For example, a second geofence 215 is present in the example of FIG. 2. In accordance with the example embodiment of FIG. 2, the purpose of geofence 201 and geofence 215 is to monitor when a mobile device or vehicle crosses a predefined boundary—either entering or leaving the specific area as defined by geofence 201 and geofence 215. The emergency data manager 100 and the geofence module 109 define the geofences (geofence 201 and geofence 215) a create a trigger-based system that responds to specific conditions, in this example, sending railway crossing warnings to mobile devices or in-vehicle systems that cross into or dwell within the geofence 201 or geofence 215, if a train is approaching the railway crossing 202.

It is to be understood that the geofence system in the example of FIG. 2 is more than knowing the location of a device. Knowing the location of a device is a passive activity. Knowing the location of a device involves continuously determining the device's position on a map or in real time without any specific action or event being triggered. In other words, knowing the location of a device is a system that reports where the device is at any given moment without any predefined actions. The geofence system example of FIG. 2 uses knowledge of device location to take action based on the triggering event of a device entering into or dwelling within the geofence 201 or geofence 215. More particularly, the geofence system in the example of FIG. 2 is proactive in that is set up to actively monitor when a device enters or exits a specified area, defined by geofence 201 and geofence 215, and it triggers the specific action of sending a railway crossing warning to the device (or a control signal in the case of autonomous vehicles). The embodiments may use location tracking however, it is to understood that location tracking is reactive and is not geofencing. Location tracking tracks the location of a device at any time, typically updating continuously or at regular intervals, but without any automatic action tied to the location data or triggering specific events.

The example geofence 201 shown in FIG. 2 is elliptical however a geofence in accordance with the embodiments may be any appropriate shape including, but not limited to, circular, polygonal, etc. The geofence 215 is an example of a rectangular geofence, and is designed to capture pedestrian mobile devices as the pedestrian carrying the mobile device walks along, or crosses over, the train tracks 204. Each geofence may have a center point 205 depending on the shape employed, and a radius 207 if circular. The example geofence 201 includes distance 208 from the railway crossing 202, and distance 209 from the railway crossing. Distance 210 runs parallel with the train tracks across the roadway substantially perpendicular to, and crossing, the roadway that intersects the railway crossing 202. The distance 208 and distance 209 may be determined by the geofence module 109 by, for example, using the speed limit (with an appropriate added margin) such that an approaching vehicle would have sufficient time to brake and stop if a train is predicted to be crossing the railway crossing 202 about the time that the vehicle enters the geofence 201 and is detected.

For example, distance 209 is determined such that as vehicle 211 enters the geofence 201, and if a train is approaching the railway crossing 202, the vehicle 211 would have sufficient time to brake and stop prior to reaching the train tracks. Some assumptions may be made in the calculation such as vehicle weight, unless this information is available.

The distance 210 may be determined such that if vehicle 213 made a left hand turn toward the train tracks there would be sufficient braking and stopping time. Right hand turns from the opposite direction may also be taken into account. More generally, the perimeter defined by the geofence 201 provides sufficient stopping distances such that a warning of an approaching train will be received in sufficient time to avoid collision. Pedestrian walkways may also be taken into account in determining the distances. For example, a set of geofences may be determined for coverage of pedestrian walkways, and may include a geofence such as example geofence 215. Likewise, each of the two roadways shown in FIG. 2 may have individual geofences specific to each roadway.

The geofence 215 may be determined such that a pedestrian would have adequate warning time prior to crossing the train tracks 204. In some implementations, a mobile device may be caused to vibrate, in addition to an audible warning, to help ensure a pedestrian carrying the mobile device is notified of an approaching train.

Figure 3:
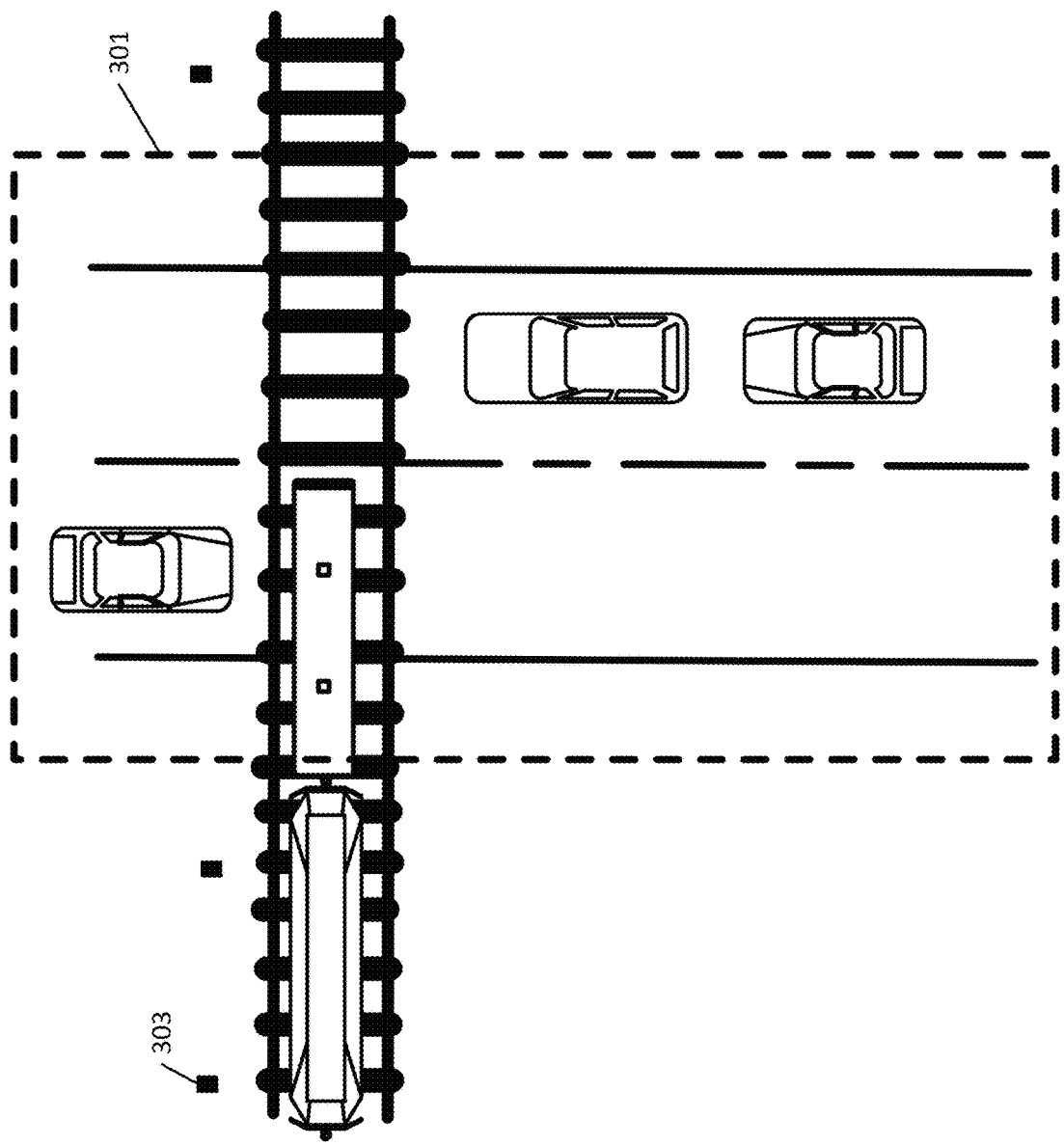
FIG. 3 is a diagram showing a geofence about a train railway crossing, in accordance with various embodiments.

FIG. 3 is an example of a rectangular geofence 301 at a railway crossing. As a train approaches the railway crossing, mile markers 303 along the tracks detect the train and send the location information to the emergency data manager 100. The train location prediction logic 103 predicts the time of arrival (TOA) of the train at the crossing, and the messaging agent 105 may provide a notification message to the mobile infotainment and mapping servers 117 and also to the autonomous vehicle navigation servers 118. In one example embodiment, the messaging agent 105 provides a push notification message to the mobile infotainment and mapping servers 117 and to the autonomous vehicle navigation servers 118. In some embodiments, the data interfaces 147 may include APIs to the emergency data manager 100 that are accessible by the mobile infotainment and mapping servers 117 and to the autonomous vehicle navigation servers 118, in order to access the notification messages generated by the emergency data manager 100. In some embodiments, the APIs may be RESTful APIs or REST APIs, Web APIs, SOAP API, or the like, etc. In some embodiments, API messages may be sent as a JSON object. In any of the embodiments, any of the vehicles having service from the mobile infotainment and mapping servers 117, or to the autonomous vehicle navigation servers 118, will in turn receive the notification messages if they enter into, or are dwelling in, the geofence 301. Likewise, any pedestrians having mobile devices will also receive the message on their mobile device. For autonomous vehicles, the autonomous vehicle navigation servers 118 may also send command and control signals to the vehicle to cause it to brake and stop, if appropriate. In some implementations, the in-vehicle control system will understand the notification message and then take the appropriate action (i.e. brake, stop, etc.) based on the contents of the message. The notification message may include both visual and audio warnings. In the case of mobile devices, the mobile device vibration unit may also be actuated by the notification message.

Regarding sensor and telematics data, the emergency data manager may receive this information from the NOC network entity 110, which may be referred to as a Network Operating Center (NOC). In the case of railway management, for both freight and passenger trains, the NOC is somewhat analogous to an air traffic controller system. A PTC (Positive Train Control) or the like system emits signals back to the NOC about the condition of the train. Sensors on board and off board a train may send information to the RMA 113 (railway management application). For example, with reference to FIG. 3, the mile markers 303 may detect when a train passes the markers and send this information back to the RMA 113. By analysis of the time between detections, the RMA 113 may detect anomalies such as incorrect speed, an unscheduled stop, time spent at a given stop, etc., and this information may also be sent to the emergency data manager 100 in some embodiments. Therefore, the mile markers may be used to determine at least that a train has stopped and is no longer progressing, and if the train is stationary and blocking the tracks. Notification messages would be sent to the vehicles and mobile devices for these scenarios also. The machine learning models 104 may be invoked and may provide a prediction of the actual problem occurring based on the sensor data and telematics 131. The REDM portal 111 may display the predicted problem within a GUI.

The train crossing notification messages sent to vehicles 152 from the mobile infotainment servers 117 are displayed on in-vehicle infotainment system displays which may also include navigation systems. Car infotainment systems are integrated platforms within vehicles that provide entertainment, navigation, communication, and connectivity features. These systems allow drivers and passengers to access media, control vehicle functions, and connect their smartphones.

Such infotainment systems are typically installed in a car's dashboard and are controlled via a touchscreen, physical buttons, or voice commands. The system can be connected to a smartphone via wired connections (like USB) or wirelessly (via Bluetooth, Wi-Fi, or Apple CarPlay and Android Auto). The systems enable the user to access various apps and functionalities related to navigation, communication, entertainment, and sometimes vehicle diagnostics.

Because many infotainment systems can connect to a smartphone via Bluetooth, USB, or wireless technology, and can receive data from the phone, such as messages, and apps like navigation software, in some implementations, the train crossing warning messages may be received by a smartphone and displayed on the infotainment system display when connected to the smartphone. In some implementations, information may be displayed within a map view of a mapping system such as, but not limited to, Google Maps or Waze, or the like, etc. Examples of infotainment systems include, but are not limited to, Apple CarPlay, Android Auto, Ford SYNC, General Motors (GM) OnStar, Mercedes-Benz MBUX, BMW iDrive, and the like, etc.

Figure 4:
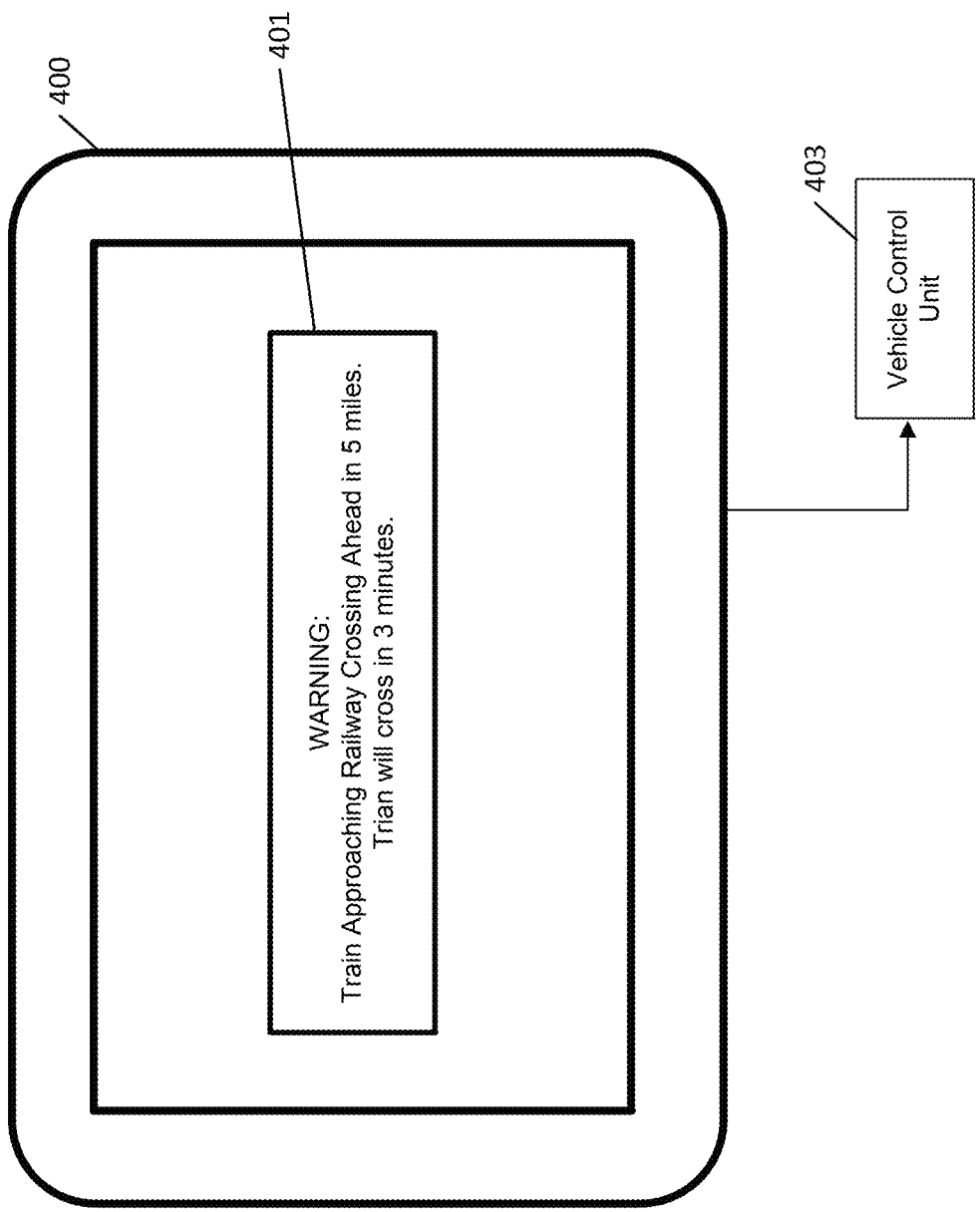
FIG. 4 is a diagram of a vehicle infotainment system display showing a warning message in accordance with various embodiments.

FIG. 4 is a diagram of a vehicle infotainment system display showing a warning message in accordance with various embodiments. A vehicle infotainment system will typically include a display 400. In response to the vehicle infotainment system receiving a railway crossing warning message, a message 401 will be displayed by the vehicle infotainment system. The message 401 may include an audio component to alert the driver to the incoming message.

In the case of autonomous vehicles, the display 400 may also be operatively computed to a vehicle control unit 403, in which the vehicle control unit is operative to steer, brake, start and stop the vehicle, initiated turn signals, etc. In that case, in addition to displaying the message 401, the vehicle may also implement control functions via the vehicle control unit 403 in response to the message 401. In some implementations, the vehicle control unit 403 will receive command and control signals from the autonomous vehicle navigation servers 118 or may receive some other data used to take control action in conjunction with the message 401.

Figure 5:
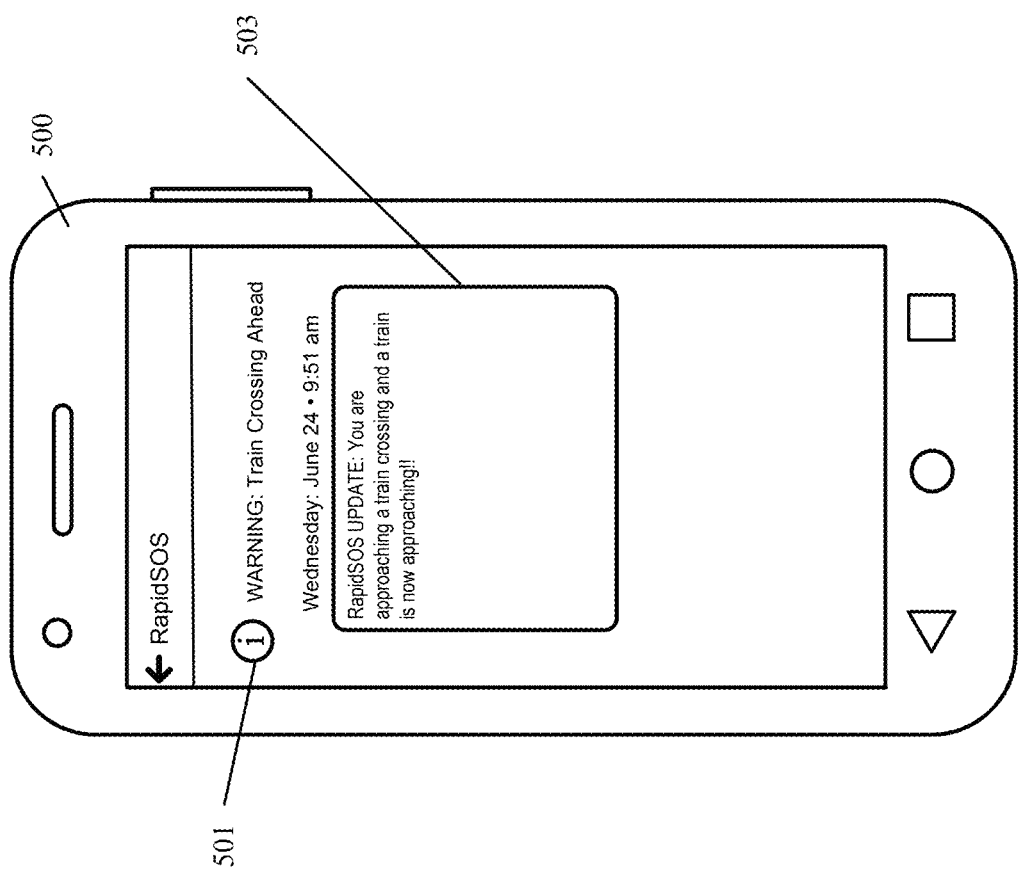
FIG. 5 is a diagram of a mobile device display showing a warning message in accordance with various embodiments.

FIG. 5 is a diagram of a mobile device display showing a warning message in accordance with various embodiments. As described above with respect to vehicle infotainment systems, in some implementations, a mobile device 500 may be tethered to, or otherwise operatively coupled to, an in-vehicle infotainment system using wired or wireless connection technology. In the case of an operatively coupled mobile device, the mobile device may jointly display a warning 501 which may, in some implementations, include warning message details 503 and may also include an audio portion. In some implementations, the mobile device 500 will convey the warning information to an infotainment system display such as the example shown in FIG. 4.

For mobile devices that are not connected to a vehicle infotainment system, such as a mobile device being carried by a pedestrian, the mobile device will also display the warnings as shown by the example of FIG. 5, when the pedestrian is within the given geofence (and when a train is predicted to be approaching).

Figure 6:
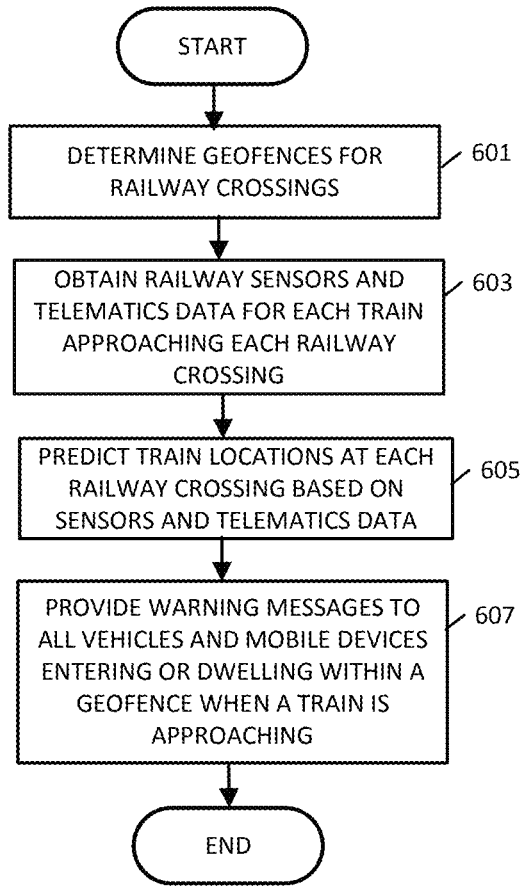
FIG. 6 is a flowchart showing a method of operation of an emergency data manager in accordance with various embodiments.

FIG. 6 is a flowchart showing a method of operation of an emergency data manager in accordance with various embodiments. At operation 601, the geofence module 109 determines geofences for railway crossings. This operation may include using a national railway crossing database such as a Federal Railroad Administration (FRA) database. Using roadway information such as speed limits at railway intersections, mapping information, etc., the geofence module may determine geofence shapes and distance parameters for each railway crossing it will monitor. At operation 603, the train prediction logic 103 obtains railway sensor and telematics data 131 from railway sensors including data received from railway network operations center network entities 110 and any data available from trains operating on the relevant tracks. At operation 605, the train location prediction logic 103 using one or more machine learning models 104 to predict train crossings at each railway crossing being monitored. At operation 607, the messaging agent 105 pushes warning messages to all vehicles and mobile devices entering or dwelling within a given geofence when a train is predicted to be crossing through the given geofence. The prediction calculation and timing of the message includes determinations of timing for vehicles to brake and stop, prior to reaching the crossing within the geofence given roadway speed limits, weather conditions, and other information. In some embodiments, the emergency data manager 100 may query for vehicles and devices within a given geofence upon making a prediction that a train is approaching the geofence (or a crossing within the geofence). Upon receiving a response, with device identifiers for any relevant vehicles and devices, the emergency data manager 100 may then send the warning messages to those vehicles and devices.

Figure 7:
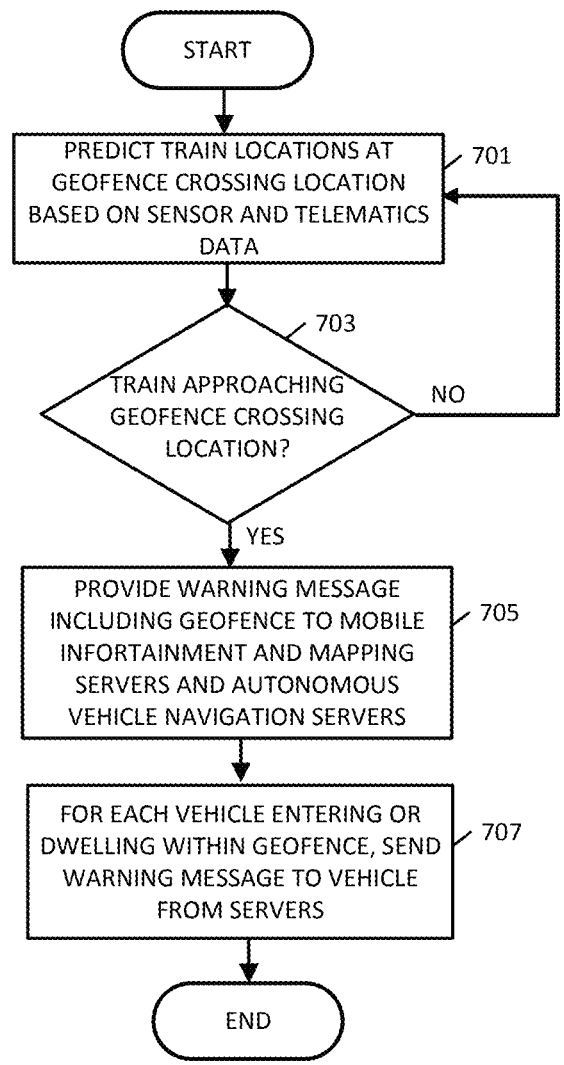
FIG. 7 is a flowchart showing a method of operation of an emergency data manager in accordance with various embodiments.

FIG. 7 is a flowchart showing a method of operation of an emergency data manager in accordance with various embodiments. At operation 701, the train location prediction logic 103 predicts train locations and when a train will cross through a given geofenced train crossing, based on sensor and telematics data 131. At decision 703, if no train is approaching, then the train location prediction logic 103 continues to monitor at operation 701. If at decision 703, a train is determined to be approaching, then at operation 705 a warning message is provided to mobile infotainment and mapping servers 117, and to autonomous vehicle navigation servers 118, along with geofence perimeter coordinates. In some embodiments, the warning message may be provided by the emergency data manager 100 using a push operation to the mobile infotainment and mapping servers 117, and to autonomous vehicle navigation servers 118. In other embodiments, the warning message may be obtained by the mobile infotainment and mapping servers 117 and by the autonomous vehicle navigation servers 118, using an API provided by the emergency data manager 100. In one example implementation, the operators of the mobile infotainment and mapping servers 117, and the autonomous vehicle navigation servers 118 may subscribe to the train warning notification system provided by the emergency data manager 100 in order to access the API provided by the emergency data manager 100. Likewise, mobile device carriers, or mobile device users, may subscribe to the system to obtain access to the API, and the corresponding predictions provided by the emergency data manager 100. Returning to the method of operation illustrated by FIG. 7, for any of the aforementioned embodiments, at operation 707, for each vehicle entering or dwelling within a given geofence, the warning message is sent to that vehicle from the mobile infotainment and mapping servers 117, or from the autonomous vehicle navigation servers 118 if it is an autonomous vehicle.

Figure 8:
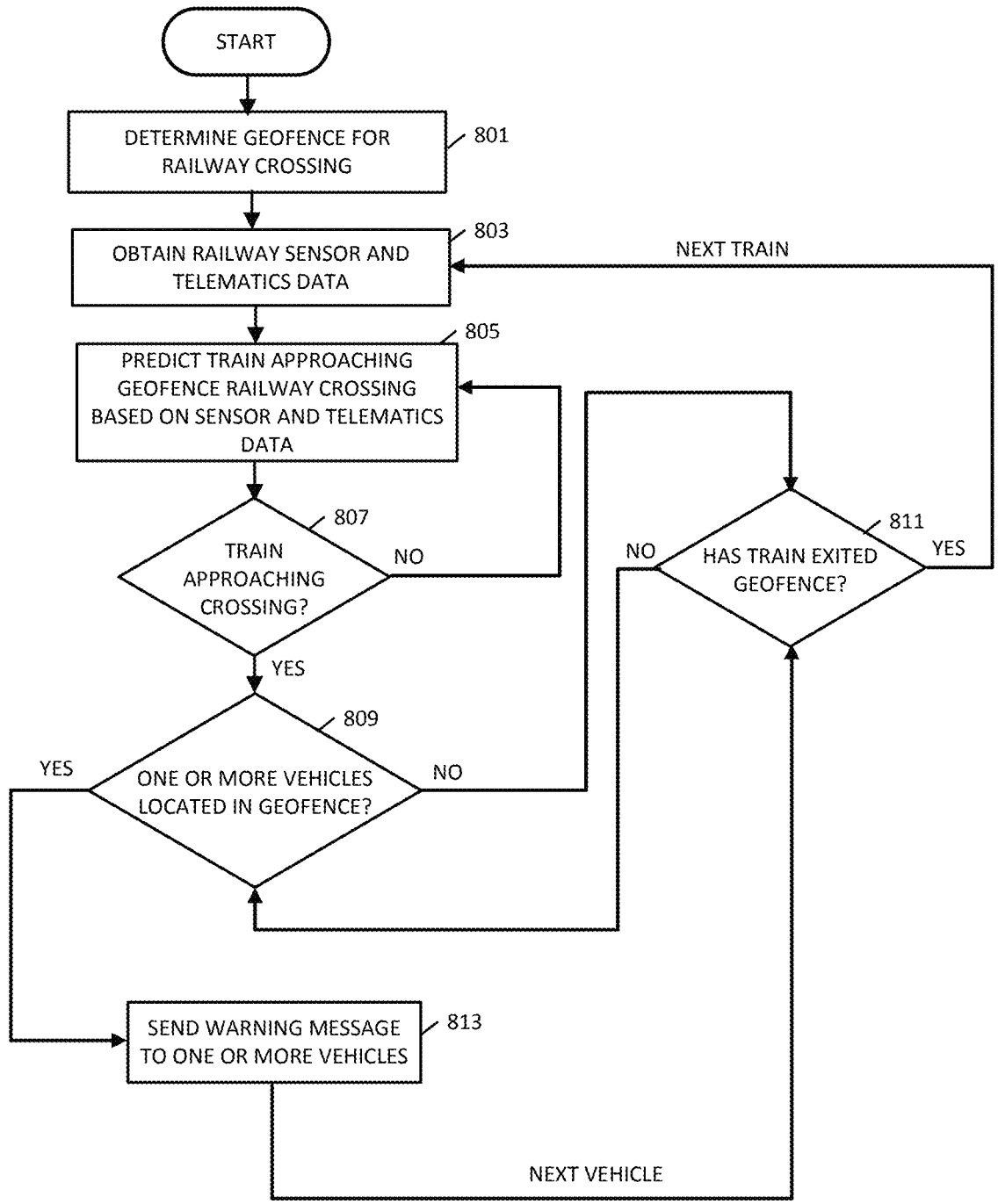
FIG. 8 is a flowchart showing a method of operation of an emergency data manager in accordance with various embodiments.

FIG. 8 is a flowchart showing a method of operation of an emergency data manager in accordance with various embodiments. At operation 801, the geofence module 109 determines a geofence for a given railway crossing. At operation 803, the train location prediction logic 103 obtains railway sensor and telematics data 131. At operation 805, the train location prediction logic 103 uses the sensor and telematics data 131 to predict whether or not a train is approaching the railway crossing within the particular geofence. At decision 807, if no train is predicted to be approaching, then the system continues to monitor the railway sensor and telematics data 131 at operation 803 and operation 805. If at decision 807 a train is predicted to be approaching the railway crossing, then at decision 809, a remote server determines if any vehicles are within or approaching the geofence having the railway crossing. If one or more vehicles are present, then at operation 813 a warning message is sent to the vehicles. If no vehicles are present at decision 809, then at decision 811 the system determines if the approaching train has already passed through and exited the geofence. If not, then the system continues to monitor for vehicles at decision 809. If the train has passed through at decision 811, the system continues to monitor railway sensor and telematics data at operation 803 for a possible next train. The operations described with respect to FIG. 8 may occur in parallel for each railway crossing that passed through a given geofence. More particularly, some geofences may have multiple railroad tracks running through them such that multiple trains may pass through a crossing at substantially the same time and may also cross from different directions. In those cases, each track is monitored by the system and therefore the method of operation of FIG. 8 may occur for each track at the geofences crossing in parallel. In some implementations, the messaging agent 105 will send an "all clear" message to the vehicles when the train has exited the geofence at decision 811.

Figure 9:
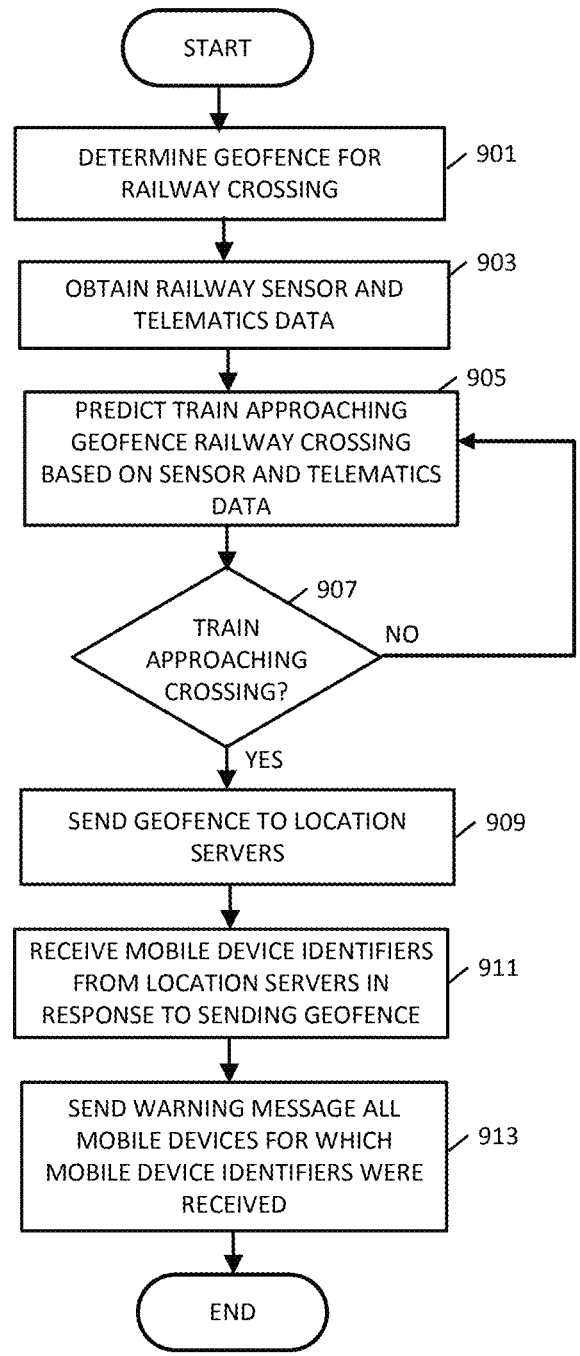
FIG. 9 is a flowchart showing a method of operation of an emergency data manager in accordance with various embodiments.

FIG. 9 is a flowchart showing a method of operation of an emergency data manager in accordance with various embodiments. At operation 901, the emergency data manager 100 determines a geofence for a given railway crossing. At operation 903, the emergency data manager 100 obtains railway sensor and telematics data 131. At operation 905, the emergency data manager 100 uses one or more machine learning models to predict when trains are approaching a railway crossing within the geofence using the sensor and telematics data 131. At decision 907, if no train is predicted, then the emergency data manager 100 continues to monitor the data to make predictions at operation 905. If at decision 907 a train is approaching the crossing, then at operation 909 the geofence coordinates are sent to various servers, such as but not limited to, mobile infotainment and mapping servers 117, autonomous vehicle navigation servers 118, and mobile device location servers 149. The mobile device location server 149 may be accessed via a data interface 148 over the Internet and may use on or more APIs, such as, but not limited to, RESTful APIs or REST APIs, etc. At operation 911 the emergency data manager 100 receives mobile device identifiers in response to sending the geofence coordinates. That is, the servers return mobile device identifiers for each mobile device or vehicle the servers identify as being within (or near) the geofence. At operation 913, the emergency data manager 100 sends warning messages to each mobile device (or vehicle) using the mobile device identifiers.

In some implementations, warning messages are sent as a data SMS (short-message-service) message and the data SMS is used by the infotainment systems or mobile devices to display an emergency message in a format determined by the particular system. In some implementations, the mobile infotainment and mapping servers 117, autonomous vehicle navigation servers 118, and mobile device location servers 149, are sent train crossing warning messages along with geofence coordinates. In that case, the mobile infotainment and mapping servers 117, autonomous vehicle navigation servers 118, and mobile device location servers 149 servers monitor location information to determine which vehicles and mobile devices are located within, or near, to the geofence and then send the train crossing warning message to those vehicles and mobile devices.

In other implementations, a geofence database is created and maintained by the emergency data manager 100, and access to the geofence database is provided to the mobile infotainment and mapping servers 117, autonomous vehicle navigation servers 118, and mobile device location servers 149. Each geofence may have a unique identifier that may be different than the perimeter coordinates. In this implementation, the servers monitor for vehicles and mobile devices within the geofences. If the emergency data manager 100 predicts a train is approaching a geofence, a flag is sent to the servers containing a geofence identifier, the geofence coordinates, or both, and the servers send warning messages in response to the flag, to any vehicles or mobile devices determined by the servers to be present within, or near to, the geofence.

In other implementations, the mobile infotainment and mapping servers 117, autonomous vehicle navigation servers 118, and mobile device location servers 149, monitor a geofence database, and send vehicle and mobile device identifiers to the emergency data manager 100 whenever the vehicles or mobile devices are located within, or near, a geofence. The emergency data manager 100 then sends warning messages directly to the vehicles or mobile devices if a train is predicted to be crossing through a relevant geofence. In this case, the emergency data manager 100 has a dynamically updated list of vehicle and mobile device identifiers, along with geofence identifiers, so that the emergency data manager 100 can send out train crossing warnings when appropriate.

In some implementations, the emergency data manager 100 sends the geofence coordinates and warning message to a navigation and mapping server, such as but not limited to, Google maps, Waze, or the like, etc., and the navigation and mapping server provides the warning message to any vehicle or mobile device approaching or located within the corresponding relevant geofence.

The train prediction logic 103 utilizes AI (artificial intelligence) to make predictions and generate messages and AI used may be, for example, but is not limited to, a large language model (LLM). The AI, in some embodiments, may further be a generative pre-trained transformer (GPT). The machine learning models 104 may include an LLM which may further be a GPT. However, the machine learning models 104 may include various machine learning models. The machine learning models 104 may include, but are not limited to, regression, decision trees, random forests, etc. and may employ an LLM to perform some, or all of these techniques as appropriate for the received data inputs and external sourced data. Therefore, in accordance with the embodiments, various machine learning models as well as generative AI may be used in combination to achieve the results of the embodiments herein described. The train prediction logic 103 and corresponding various AI models are trained using railway data from one or more railways collected over a period of time from weeks, months or years. In one example, a regression model may be built using a neural network that may be trained to make predictions of railway crossings using the railway sensor and telematics data inputs and other externally sourced data which may include, but is not limited to, sensor data, video data, image data, text data, audio data, or using any combination thereof. Any utilized machine learning models may also be updated from time-to-time using new or additional training data, or may be updated using reinforcement learning from human feedback (RLHF) in order to optimize the machine learning models.

For utilization of LLMs, prompts are engineered and tested using the same data from one or more railways collected over a period of time from weeks, months or years. The prompts are accordingly adjusted iteratively until acceptable results are obtained in what may be considered a form of RLHF with respect to LLM prompt engineering.

The emergency data manager 100 provides a cloud application 102 to at least one ECC network entity 120 via an interface 122 and an emergency data manager portal 121 which may be executed in a web browser on the ECC network entity 120. The emergency data manager 100 may provide a mapping layer to the emergency data manager portal that shows railway crossings, and corresponding geofence boundaries, for railway crossing that are within, or near, jurisdictional boundaries of a given ECC.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
   determining, by a cloud server operatively coupled to at least one railway network operating center via an internet protocol connection, a vehicle geofence surrounding a section of a roadway at a crossing of train tracks, the vehicle geofence comprising vehicle geofence coordinates and determined using mapping information for each crossing obtained from a railroad database, wherein the mapping information is used to determine a shape and size for each vehicle geofence;
   determining, by the cloud server, a pedestrian geofence surrounding a section of a roadway at a crossing of train tracks, the pedestrian geofence comprising pedestrian geofence coordinates and determined using mapping information for each crossing obtained from the railroad database, wherein the mapping information is used to determine a shape and size for each pedestrian geofence, wherein the pedestrian geofence shape and size encompasses at least a pedestrian walkway and partially overlaps the vehicle geofence;
   monitoring, by the cloud server, railway sensor and telematics data received from the at least one railway network operating center;
   predicting, by the cloud server, that a train will approach the crossing at a predicted time based on the railway sensor and telematics data;
   generating a warning message in response to predicting that the train will approach the crossing at the predicted time;
   sending the warning message to at least one remote server, along with vehicle geofence coordinates and pedestrian geofence coordinates;
   determining, by the at least one remote server, that a vehicle is located within the vehicle geofence based on vehicle location information at the at least one remote server;
   sending the warning message to a vehicle infotainment system in response to determining that the vehicle is located within the vehicle geofence; and
   sending the warning message to the vehicle located within the vehicle geofence.

2. The method of claim 1, further comprising:
   determining, by the at least one remote server, that a pedestrian is located within the pedestrian geofence based on mobile device location information at the at least one remote server; and
   sending the warning message to a mobile device located within the geofence pedestrian geofence.

3. The method of claim 1, wherein sending the warning message to at least one remote server, along with vehicle geofence coordinates and pedestrian geofence coordinates, comprises:
   sending the warning message to a navigation and mapping server.

4. The method of claim 1, wherein sending the warning message to a vehicle located within the vehicle geofence, comprises:
   sending the warning message to a vehicle infotainment system of the vehicle located within the vehicle geofence.

5. The method of claim 1, wherein sending the warning message to a vehicle located within the vehicle geofence, comprises:
   sending the warning message to a mobile device, operatively coupled to a vehicle infotainment system of the vehicle located within the vehicle geofence.

6. The method of claim 1, further comprising:
   receiving at least one device identifier for a device located with the pedestrian geofence, in response to providing the pedestrian geofence coordinates to the at least one remote server.

7. A cloud-based railway crossing warning system comprising:
- at least one cloud server, comprising a cloud application, operatively coupled to at least one railway network operating center to receive railway sensors and telematics data, and operatively coupled to non-volatile, non-transitory memory, the at least one cloud server operative to:
- determine a geofence surrounding a section of a roadway at a crossing of train tracks, the geofence comprising geofence coordinates, and determined using mapping information for each crossing obtained from a railroad database, wherein the mapping information is used to determine a shape and size for each vehicle geofence;
- determine a pedestrian geofence surrounding a section of a roadway at a crossing of train tracks, the pedestrian geofence comprising pedestrian geofence coordinates and determined using mapping information for each crossing obtained from the railroad database, wherein the mapping information is used to determine a shape and size for each pedestrian geofence, wherein the pedestrian geofence shape and size encompasses at least a pedestrian walkway and partially overlaps the vehicle geofence;
- monitor the railway sensors and telematics data obtained from the railway network operating center;
- predict that a train will approach the crossing at a predicted time based on the railway sensors and telematics data;
- generate a warning message in response to predicting that the train will approach the crossing at the predicted time;
- send the warning message to at least one remote server, along with vehicle geofence coordinates and pedestrian geofence coordinates;
- determine, by the at least one remote server, that a vehicle is located within the vehicle geofence based on vehicle location information at the at least one remote server;
- send the warning message to a vehicle infotainment system in response to determining that the vehicle is located within the vehicle geofence; and
- send the warning message to the vehicle located within the vehicle geofence.

8. The cloud-based railway crossing warning system of claim 7, wherein the at least one cloud server is further operative to:
- determine, by the at least one remote server, that a pedestrian is located within the pedestrian geofence based on mobile device location information at the at least one remote server; and
- send the warning message to a mobile device located within the pedestrian geofence.

9. The cloud-based railway crossing warning system of claim 7, wherein the at least one cloud server is further operative to:
- send the warning message to a navigation and mapping server where the navigation and mapping server is the at least one remote server.

10. The cloud-based railway crossing warning system of claim 7, wherein the at least one cloud server is further operative to send the warning message to a vehicle located within the vehicle geofence, by:
- sending the warning message to a vehicle infotainment system of the vehicle located within the vehicle geofence.

11. The cloud-based railway crossing warning system of claim 7, wherein the at least one cloud server is further operative to sending the warning message to a vehicle located within the vehicle geofence, by:
- sending the warning message to a mobile device, operatively coupled to a vehicle infotainment system of the vehicle located within the vehicle geofence.

12. The system of claim 7, wherein the at least one cloud server is further operative to:
- receive at least one device identifier for a device located with the pedestrian geofence, in response to providing the pedestrian geofence coordinates to the at least one remote server.

13. A method comprising:
- monitoring, by an artificial intelligence module within a cloud server that is operatively coupled to a railway network operating center to receive railway sensors and telematics data;
- predicting, by the artificial intelligence module that a train will approach a crossing at a predicted time, using the railway sensors and telematics data;
- determining, by the artificial intelligence module, a plurality of vehicle geofences and a plurality of pedestrian geofences, wherein each vehicle geofence and at least one pedestrian geofence correspond to each crossing of a plurality of crossings, using mapping information for each crossing obtained from a railroad database, wherein the mapping information is used to determine a shape and size for each vehicle geofence and for each pedestrian geofence, and where each pedestrian geofence at least partially overlaps a corresponding vehicle geofence;
- generating warning messages corresponding to the plurality of crossings and based on a vehicle geofence and a pedestrian geofence surrounding each crossing; and
- sending the warning messages to vehicles located within the vehicle geofences.

* * * * *